Sept. 25, 1962     J. S. McALLISTER     3,055,140
MOUSE TRAP
Filed Jan. 6, 1961
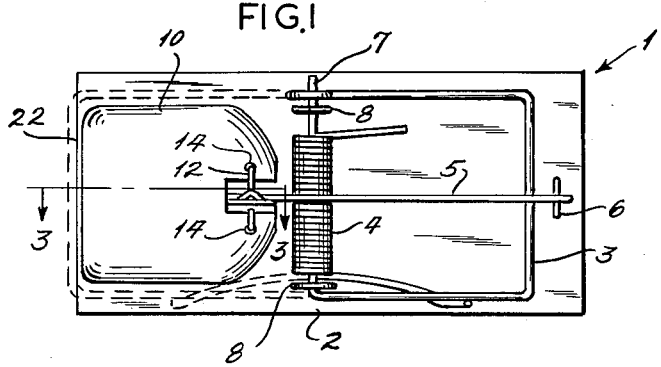
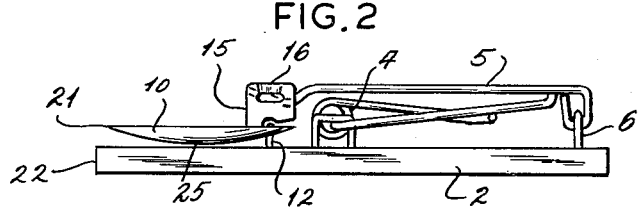
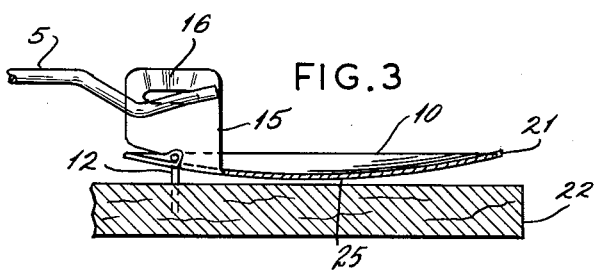
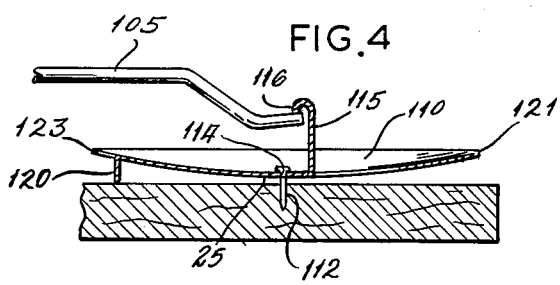
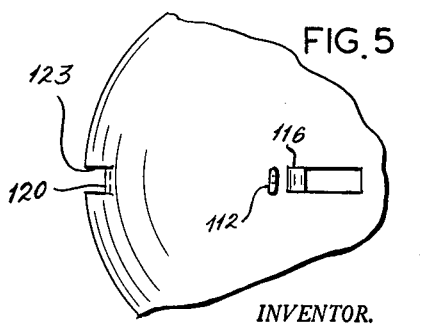
INVENTOR.
JACK S. McALLISTER
BY
*Sutherland, Colett & Taylor*
ATTORNEYS.

3,055,140
         MOUSE TRAP
Jack S. McAllister, 467 N. 73rd St., Centreville, Ill.
       Filed Jan. 6, 1961, Ser. No. 81,117
              3 Claims. (Cl. 43—81)

This invention relates to mouse traps, and particularly to the type of trap having a spring biased, swinging wire striker.

Mouse traps are, of course, extremely old. According to Knight's Mechanical Dictionary, Samuel Pepys recorded in his diary the purchase of two of them. However, mouse traps of the noose or striker type have been designed for use with bait, to induce the mouse to assume what was thought to be the necessary position for an effective kill. Traps designed to be operated by the weight of the mouse have been of the falling platform type, and have also been baited to induce the mouse to step on the proper spot. At least in these days of refined sensibilities, almost everyone is squeamish about rebaiting a trap.

One of the objects of this invention is to provide a simple, effective mouse trap utilizing in large part conventional elements, which requires no bait.

Other objects will become apparent to those skilled in the art in the light of the following disclosure and accompanying drawing.

In accordance with this invention, generally stated, a mouse trap of the type having a base, a spring biased swinging wire striker, and a trigger release for the striker, is provided with a wobble plate forming part of the trigger mechanism. The wobble plate is dished in a direction toward the base to form an arcuate bearing surface against a flat base. The wobble plate is shaped similarly to the outline of the striker, occupies substantially all of the area within the boundary of the striker when the trap is sprung, and is positioned closely adjacent one free edge of the base, in such a way that the wobble plate can be positioned very closely adjacent a baseboard or the like.

I have discovered that with the treadle or wobble plate of this invention, a trap placed in such a way that the treadle is closely adjacent the baseboard will catch mice at least as effectively as and perhaps more effectively than baited traps. Mice habitually stay close to a wall, and will attempt to cross over the treadle of this invention, rather than to go around the trap. Since the treadle is positioned closely adjacent the wall, the mouse is in position to be killed by the striker when the mouse trips the trigger mechanism by touching the treadle or wobble plate of this invention.

In the drawing,

FIGURE 1 is a top plan view of one embodiment of this invention;

FIGURE 2 is a view in side elevation of the top of FIGURE 1;

FIGURE 3 is an enlarged fragmentary detail view showing the wobble plate of the trap shown in FIGURES 1 and 2;

FIGURE 4 is a fragmentary detail view in side elevation showing another embodiment of wobble plate of this invention; and FIGURE 5 is a fragmentary top plan view of the plate shown in FIGURE 4.

Referring now to the drawing and particularly FIGURES 1–3 for one illustrative embodiment of this invention, reference numeral 1 indicates a mouse trap with a conventional elongated rectangular base 2, striker 3, spring 4, and latch or retainer bar 5. The retainer bar 5 is pivoted to the base on a staple 6. The striker 3 is hinged about one of its own legs 7 as a pintle, with a pair of staples 8 as the knuckles. Reference numeral 10 indicates an illustrative embodiment of treadle or wobble plate of this invention. The treadle 10 is loosely mounted on the base 2 by means of a staple 12, extending through holes 14 in the treadle. A trigger ear 15 is struck up integrally from the treadle 10, and is provided with a trip ledge 16, integral with the ear 15.

It will be observed from FIGURE 1 that the treadle occupies substantially all of the area within the embrace of the striker 3 when the striker is in its sprung position. The treadle is prevented from moving into the path of the striker by the arrangement of the staple 12 and holes 14. In particular, the outer edge 21 of the treadle is practically coincident with the edge 22 of the base over which the striker snaps when the trap is sprung.

As can be seen in FIGURE 2, the wobble plate 10 is dished. This provides an arcuate bearing surface 25, which, when bearing upon the base 2, enables the plate 10 to be rocked in such a way as to release the latch bar 5 at the merest touch. However, as shown in FIGURE 2, in the preferred embodiment, the wobble plate does not rest upon the base when the trap is set, but is held just off the base by the upward bias of the latch or retainer bar 5, so as to facilitate release of the bar from the trap ledge 16 when the wobble plate is moved at right angles to the staple 12, i.e., when the wobble plate is depressed at its outermost edge 21. However, if the plate is depressed nearer to the staple 12 than to the edge 21, the wobble plate may be depressed against the base, and rock thereon to release the bar 5 from the ledge 16.

In FIGURES 4 and 5, there is shown another illustrative embodiment of this invention, wherein the conventional parts are the same as in the trap of the embodiment shown in FIGURES 1–3, except that a latch bar 105 is longer, to reach beyond the center of a wobble plate 110. The wobble plate 110 is pivoted to the base by means of a wide, flat pin 112, extending through a slot 114 in the plate 110. The slot 114 is so formed as to prevent the rotation of the plate 110. A trigger ear 115, with a narrow trip ledge 116, is struck up from the wobble plate between the slot 114 and the outer edge 121 of the wobble plate. An elevation tab 120, struck from the treadle along the opposite edge 123 of the plate 110 from the edge 121, serves to limit the elevation of the edge 121 in response to the bias of the latch bar 105.

Having thus described the invention, what is claimed and desired to be secured by Letters Patent is:

1. In a mouse trap of the type having a base, a spring biased swinging wire striker of substantially rectangular shape hinged on said base, and a trigger release for said striker, the improvement comprising a latch bar and a wobble plate forming part of the trigger release, said wobble plate having a latch bar trigger ear and being dished in a direction toward the base to form an arcuate bearing surface against said base when said wobble plate is depressed against said base, said wobble plate being loosely pivoted on said base for rocking movement with respect thereto on pivot means permitting the said wobble plate to be raised, by the action of the latch bar on the trigger ear, slightly above the surface of the base when said trap is set, said wobble plate being of similar shape to but slightly smaller than the said striker, being positioned by its pivot means with its upper rim substantially parallel to the base when the trap is set, and within the compass of the striker when the trap is sprung, but close to one outer edge of said base, whereby the trap can be placed contiguous a baseboard with the wobble plate closely adjacent thereto.

2. The mouse trap of claim 1, wherein the wobble plate is loosely pivoted on a pin at the center of the plate, the trigger ear is secured to the plate between the edge of the wobble plate close to the outer edge of the base and the pin, said ear having a latch bar receiving ledge, and an elevation stop is secured to and extends beneath the edge of the wobble plate opposite the edge close to the outer edge of the base.

3. The mouse trap of claim 1, wherein the wobble plate is pivoted to its side away from the outer edge of the base, the trigger ear is secured to the wobble plate with a trip ledge directly above the pivot axis, and the trip ledge is substantially parallel with the ledge-engaging end of the latch bar when the trap is set.

References Cited in the file of this patent

UNITED STATES PATENTS 1,464,559   Britan _____ Aug. 14, 1923

FOREIGN PATENTS 600,965   Great Britain _____ Apr. 23, 1948